United States Patent [19]

Sundermeyer et al.

[11] 4,298,959
[45] Nov. 3, 1981

[54] DIGITAL INFORMATION TRANSFER SYSTEM (DITS) RECEIVER

[75] Inventors: Frank D. Sundermeyer, Middletown, Conn.; Richard W. Calcasola, Longmeadow, Mass.

[73] Assignee: United Technologies Corporation, Hartford, Conn.

[21] Appl. No.: 96,969

[22] Filed: Nov. 23, 1979

[51] Int. Cl.³ .............................................. G06F 3/04
[52] U.S. Cl. ....................................................... 364/900
[58] Field of Search ... 364/200 MS File, 900 MS File, 364/481, 550, 551

[56] References Cited

U.S. PATENT DOCUMENTS

3,891,971  6/1975  Hirvela et al. .................. 364/900
4,003,032  1/1977  Austin et al. .................. 364/200

*Primary Examiner*—Raulfe B. Zache
*Attorney, Agent, or Firm*—Dominic J. Chiantera

[57] ABSTRACT

A DITS receiver provides direct memory access (DMA) for a central processing unit (CPU) to the latest update value of a plurality of pre-identified signal data words stored in a DITS data RAM. The DITS stores the data received asynchronously on a plurality of input channels directly in RAM as it is received, by stripping the first byte of the data word information field which identifies the data source and using this first byte ID as an address pointer to define the location in RAM for each remaining signal bit of the data word. The DITS slices the data received on each input channel into samples of less than one bit cell duration through a common sampling network which under sequence control provides commutation of the input channel samples to ensure that dual speed input channel are each sampled at least one time within the signal speed time period. The sampled data is multiplexed into a serial data stream and steered either to a first byte address register or directly to the data RAM.

9 Claims, 9 Drawing Figures

PRESENT VALUE ($V_A$, $V_B$)

| PAST VALUE ($V_A$, $V_B$) | 0,0 | 0,1 | 1,0 | 1,1 |
|---|---|---|---|---|
| 0,0 | NULL | LOW | HIGH | ✗ |
| 0,1 | NULL | NULL | HIGH | LOW |
| 1,0 | NULL | LOW | NULL | HIGH |
| 1,1 | ✗ | LOW | HIGH | NULL |

DIGITAL INFORMATION TRANSFER SYSTEM (DITS) RECEIVER

DESCRIPTION

Technical Field

This invention relates to direct memory access (DMA) signal processing, and more particularly to a high speed DITS receiver for providing DMA processing of multiple asynchronous input data words without processor overhead.

Background Art

DMA signal processing is well known in information transfer systems for storing in a random access memory (RAM) directly accessible by a CPU, the most recent information or data received from one or more sources of signal transmissions. The purpose of the DMA circuitry is to provide ready access by the CPU to the received data with a minimum of CPU overhead. The DMA circuitry receives the data serially at one or more input channels, provides the signal conditioning necessary for converting the data into a form acceptable to the processor based system, and stores the conditioned data at selected address locations in the data RAM.

In typical airborne information transfer systems, such as airborne integrated data systems (AIDS), where the performance of various on board systems are monitored by constantly sensing various operating indicia, the information transferred relates to the various sensed parameters of the systems and is provided asynchronously from various sources to a data acquisition unit (DAU). The up-data intervals of the sensed parameters vary with higer iteration rates required for particular system controls. The requirements then for present configuration DMA devices is to receive and process a plurality of different parameter data information received on each of a multiple number of receiver channels, or inputs, with high and low signal speeds (transmission frequencies) and with the requirement to store the latest up-date parameter value. In addition data integrity is essential since the sensed parameter data is used in the control of the related system.

Typical of the prior art approaches to providing the data handling capacity required of the DMA receiver are: (1) the use of multiple micro-processors, each dedicated for use with one or more of the input channels and each providing the required signal conditioning and data storage in RAM, or (2) variations of a multiple dedicated receiver configuration, with either a dedicated hardware configuration or multiple LSI receivers, such as the proposed Harris 429 DITS receiver/transmitter chip. The disadvantages of these prior art approaches are the high cost and the requirement for a significant share of the CPU overhead time. In addition, these approaches result in a DMA receiver configuration which requires a high parts count, is sensitive to data-up-date rates, requires sophisticated parameter selection circuitry, and cannot, without data loss, be easily multiplexed to handle more than one input channel.

DISCLOSURE OF THE INVENTION

An object of the present invention is to provide interim storage of the most recent value of a plurality of asynchronous data signals for DMA by a processor based information data system without use of processor overhead time. Another object of the present invention is to provide a DITS receiver having common data sampling circuitry for sampling serial data received in a dual signal speed format.

According to the DITS receiver of the present invention, serial data words having an information field with a first byte data identification (ID) designator are stored directly in a DITS data RAM accessible to the processor at a RAM address defined by the first byte data ID. In further accord with the present invention the data is received asynchronously on one or more input channels and a common sampling network in response to sequential address signals provided by a channel sequencer samples each channel at least one time in the signal speed period for a time interval less than the bit cell time to provide a serial multiplexed signal bit stream comprising the samples from each channel to a sequence controller, which steers the first byte signal bits of each word to an address register for accumulation and storage therein and which, in response to the presence of the last bit of the first byte of a particular data word being stored in the address register, steers the remaining signal bits of the data word directly to a data RAM for storage at the address location defined by the first byte ID stored in the address register, the data in RAM being accessible to the processor at the ID address location thereby allowing processor identification of the desired data to be read by the particular data ID. In still further accord with the present invention the common sampling network of the DITS receiver samples asynchronous serial data provided at a plurality of input channels in an ARINC 717-1 dual signal speed format, the sampling network providing a common channel sample time for each channel, the sampling network providing at least one sample of both high speed and low speed signals on each channel within the signal speed period of each.

These and other objects, features, and advantages of the present invention will become more apparent in light of the detailed description of an embodiment thereof, as illustrated in the accompanying drawing.

BEST MODE FOR CARRYING OUT THE INVENTION

Figure 2:
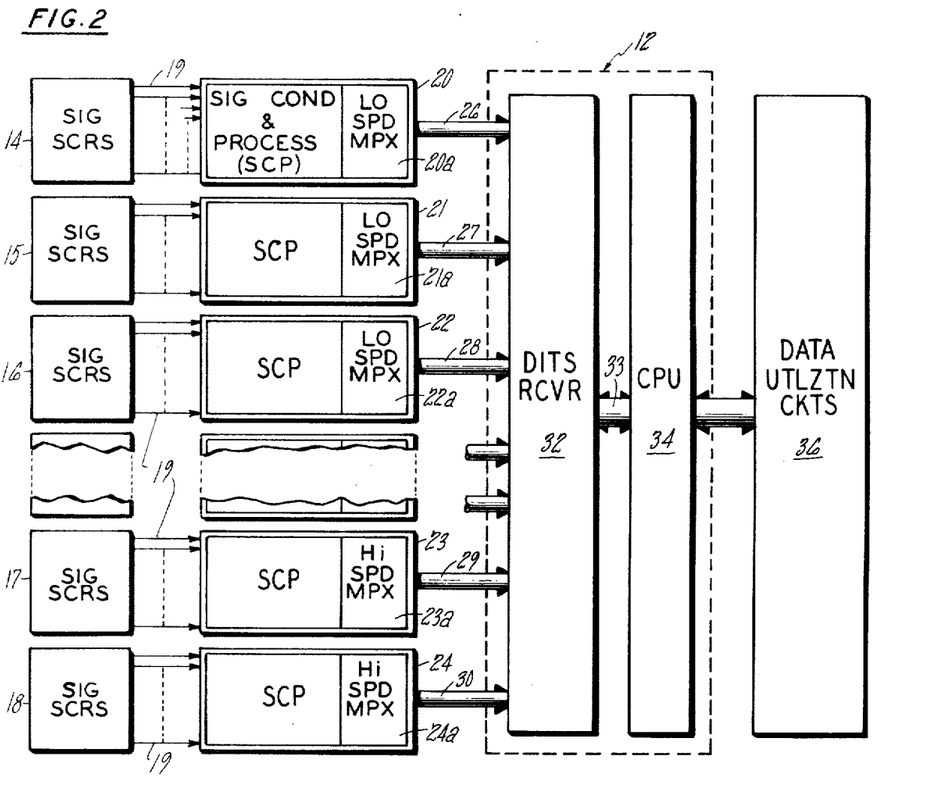
FIG. 2 is a system block diagram illustration of a data acquisition system utilizing the DITS receiver of FIG. 1.

Referring first to FIG. 2, as known a data acquisition unit (DAU) 12 acquires signal information, such as sensed parameter signal data, from a plurality of remote signal source groups 14-18. Each group itself includes a plurality of individual signal sources which themselves may or may not be related, such as data sensors disposed in the same or in different types or pieces of equipment, instrumentation, etc., but which are grouped because of their relationship to a common system function or location. The signal information from each source is presented through a plurality of lines 19 to the associated one of a number of remote signal processors 20-24 which signal condition the information, including analog-to-digital (A/D) conversion of sensed analog signals, and transmit the digital signal data serially through lines 26-30 to the DAU in a selected, common message unit format. In the DAU the signal data is received by a digital information transmission system (DITS) receiver 32 which is connected through lines 33 to the central processing unit (CPU) 34 of the DAU and which provides direct memory access (DMA) for the CPU to the latest up-dated value of the received signal data. The CPU processes the data in whatever manner required for use by the data utilization circuits 36 which may include supervisory control systems, history recorders, and so on.

In airborne applications the DAU receives the digital signal data from various operating components of the aircraft and the avionic equipment installed on board, including engine, navigational equipment, and environmental control system data. The data is separately labeled with a parameter ID included in the message format by each of the remote processors 20-24 and is transmitted over the lines 26-30 in a simplex mode (one direction only) to the DAU. The data is transmitted asynchronously by the processors since it originates from different sources and is provided to the processors at different up-date intervals. The transmission frequency, or signal speed of the data, i.e. the baud, is common for all of the data transmitted over a given one of the input lines 26-30. The signal speed over different input lines may also be common, or may be provided as a dual speed simplex mode as required by ARINC 717-1 specifications where some of the inputs are dedicated to low signal speed transmission and the remainder to a higher signal speed. In FIG. 2 a dual speed system is illustrated with the processors 20-22 providing the low signal speed transmission through low speed multiplexers (MPX) 20a-22a, and processors 23-24 providing high signal speed transmission through high speed MPX's 23a-24a.

Figure 1:
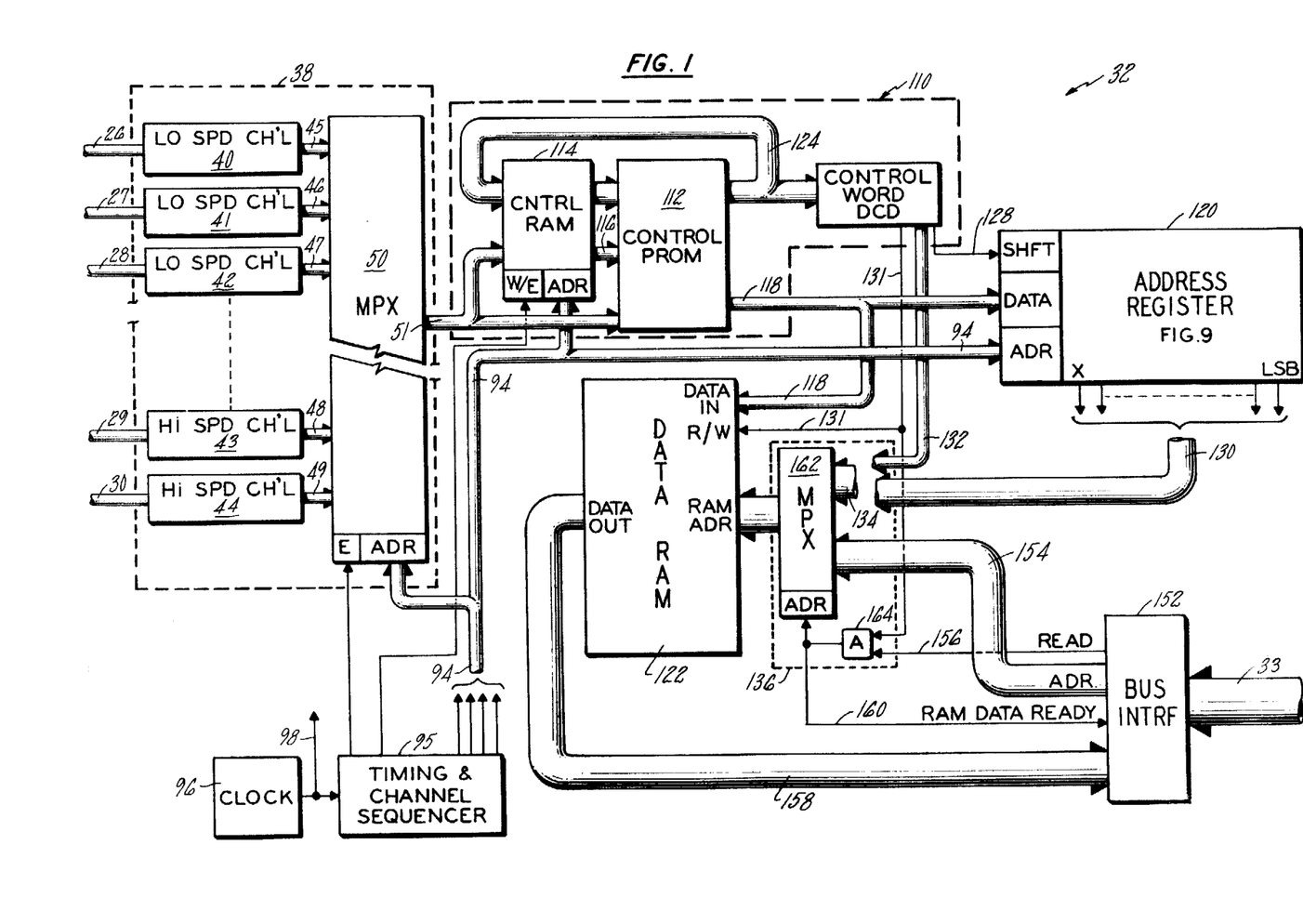
FIG. 1 is a system block diagram illustration of one embodiment of a DITS receiver according to the present invention.

Referring now to FIG. 1, in a DITS receiver 34 according to the present invention the lines 26-30 are received at an input stage 38 and presented to an associated one of the input channels 40-44, including low speed channels (40-42) for lines 26-28 and high speed channels (43,44) for lines 29, 30. For a single speed system all of the channels would be identical. As described in detail hereinafter, each of the channels provides signal reconditioning and, as necessary, conversion of the received signal bit format from that used for transmission, such as the bi-polar return-to-zero (BRZ) format specified by ARINC 429, to a processor compatible T²L format. The conditioned output signals from each channel are presented through lines 45-49 to a multiplexer (MPX) 50, of a type known in the art, which for N number of input channels provides N-to-1 signal multiplexing of the conditioned signals from each channel onto an output line 51.

Figure 3:
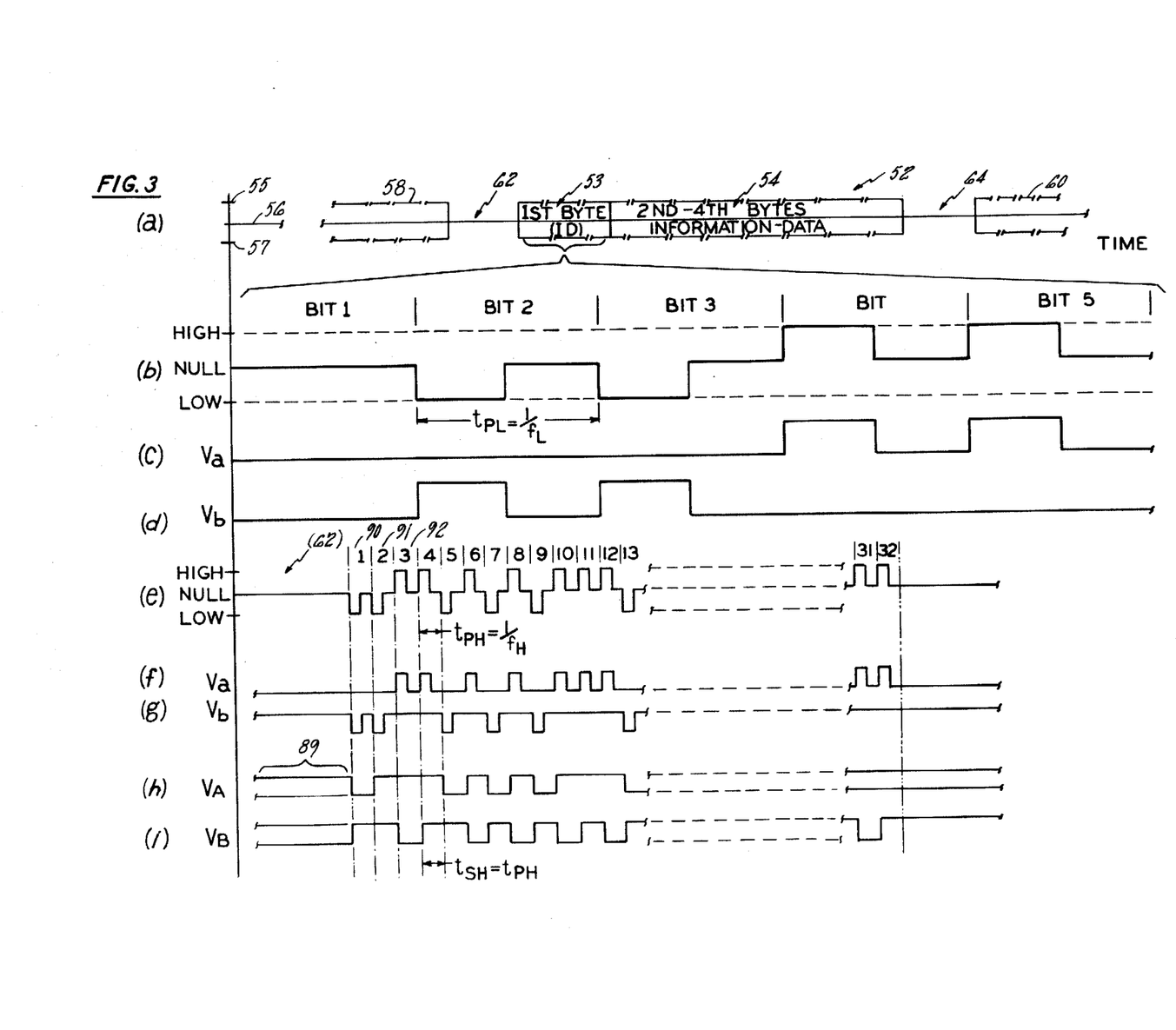
FIG. 3 is an illustration of various signal waveforms used in the description of the embodiment of FIG. 1.

If the information from the remote processors is in the BRZ signal format prescribed by ARINC 429, the serial signal information received on lines 26-30 is in successive frames, each representing a complete data word comprising a 32 bit information field divided into four 8 bit bytes. As shown in FIG. 3, illustration (a), each word, such as the word 52, includes a first byte 53 signal parameter identification (ID), i.e. engine fan speed ($N_1$), turbine temperature ($T_T$) etc., and the remaining three bytes 54 contain the identified information, or parameter value. As known the BRZ signal is a tri-state signal with a high level 55, a null state 56, and a low level 57. The word 52 is separated from the preceding and succeeding words 58, 60 by gap intervals 62, 64 of no information where the BRZ signal is in the null state for a minimum of four bit cell times. Since the data on the lines 26-30 is received asynchronously by the input stage (38, FIG. 2) each word is considered valid only if preceded by a minimum four bit gap, and the beginning of a valid new word is detected by the DITS receiver as the first information bit following a valid gap. Illustration (b) shows the BRZ format for the first five bits of the word 52 which is assumed to be at a low signal speed (lines 26-28), each of which is a two wire conductor, as opposed to the high signal speed data inputs illustrated in FIG. 3 (e) and described hereinafter. The bit cell time ($t_p$) is the reciprocal of the signal speed (transmission frequency (1/f), however, the signal bit information appears in only one half the bit cell time since in the BRZ format each information bit must be followed by a null state.

Figure 4:
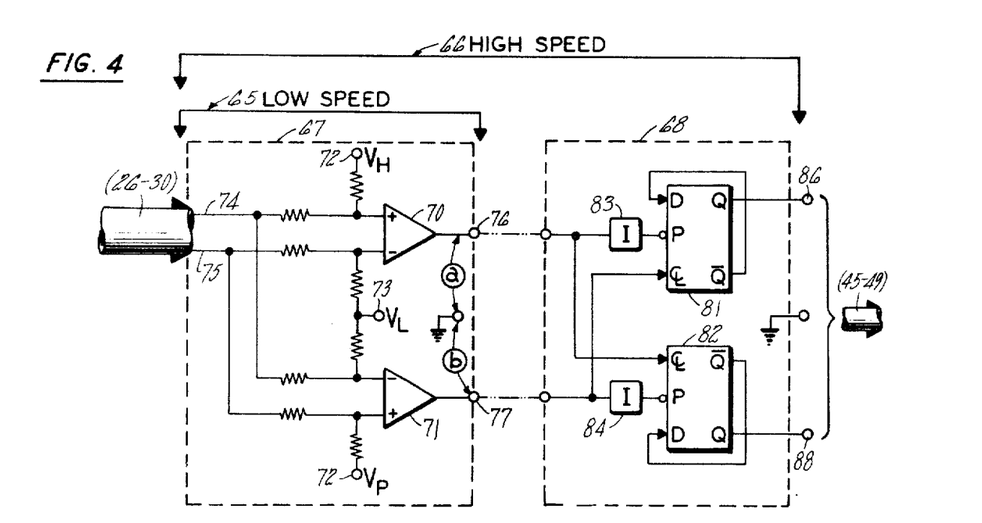
FIG. 4 is a schematic diagram illustration of one element of the embodiment of FIG. 1.

Referring again to FIG. 1, each of the DITS receiver input channels 40-44 includes a signal converter stage which converts the received BRZ input signals to dual non-return to zero (NRZ) which together define the received signal information content. As with the BRZ signals the dual NRZ converted signals include the signal bit information in only one half the bit cell time, requiring a sampling rate which is at least twice that of the received data signal speed. In the low speed channels (40-42) the dual NRZ converted signals are provided directly to the associated output line (45-47) for presentation to the MPX 50. As described in detail hereinafter, the high speed channels 43, 44 further include a high speed encoder which effectively stretches the signal bits to the full cell time prior to presentation to the MPX 50. FIG. 4 illustrates the configuration of a low speed channel as defined by bracket 65, and a high speed channel as defined by bracket 66. The low speed channel configuration 65 includes the signal converter 66 alone whereas the high speed configuration includes the converter 67 in combination with the high speed encoder 68.

The converter 66 is a "window comparator" with dual comparators 70, 71 each with a non-inverting (+) and inverting (−) input. The non-inverting inputs are connected through associated resistors to a high level voltage source ($V_H$) 72 and each of the inverting inputs are connected through equal value resistors to a low level voltage source ($V_L$) 73. The voltage sources establish the high and low crossover thresholds for the high and low levels of the BRZ signals. The input lines 26-30 each include two conductors, such as lines 74, 75, which are connected to the inverting and non-inverting inputs of the comparators through current limiting resistors as shown. The output of comparators 70, 71 are provided as signals $V_a$, $V_b$ on lines 76, 77, respectively. Each output is an NRZ signal which is either a high (1) or low (0) level in dependence on the BRZ input level. To illustrate, the BRZ signal of FIG. 3, illustration (b) is presented on lines 74, 75 to the dual comparators. The first bit (bit #1) is in the null state which is a voltage level intermediate to that of the voltage sources $V_H$, $V_L$ such that the output signals $V_a$, $V_b$ on the lines 76, 77 are each at a low level (0) as shown in FIG. 3, illustrations (c), (d). The second bit (bit #2) of the input signal is a low level signal bit for the first half of the bit cell such that the line 74 is negative with respect to the line 75 and the output of the comparator 70 ($V_a$) remains low while that of the comparator 71 ($V_b$) transitions high. This continues, as illustrated for each of the first five bits in illustration (b) by the encoded NRZ signals of illustrations (c), (d) as they appear on the lines 76, 77. In this manner the tri-state BRZ signal format of the received signals are converted into dual binary NRZ signals which are CPU compatible, with the combination 1's and 0's of $V_a$ and $V_b$ uniquely defining the high and low levels transitions of the input signal.

The dual NRZ signals $V_a$, $V_b$, have the same baud rate as the BRZ signals, i.e. the bit information is present only for one-half the bit period. The signals must be sampled at greater than twice the frequency of the received input signal in order to detect the information bit state. With the dual transmission frequency requirements of ARINC 717-1 the low frequency transmission frequency is specified as a range of frequencies from 10 to 14 KHz, whereas the high transmission frequency is specified as 100 KHz. The DITS low speed sample frequency for the maximum low transmission frequency of 14 KHz must be greater than 28 KHz whereas the high speed sample frequency must be greater than 200 KHz. In the DITS receiver of the present invention the required high speed sample frequency is reduced by one-half by the high speed encoder (68, FIG. 4) which stretches the dual NRZ signal bits to the full bit cell time thereby effectively reducing the high signal speed by one-half.

FIG. 3, illustration (e) depicts a high transmission frequency ($f_H$) BRZ input signal with a bit cell time $t_{PH}=1/f_H$, and the corresponding dual NRZ signals ($V_a$, $V_b$) from the converter (67, FIG. 4) of the associated high speed channel are shown in illustrations (f, g). The signals from the converter include the clock frequency of the BRZ signals, i.e. each comparator is clocked by the input signal. Referring again to FIG. 4, in the high speed channels the signals $V_a$, $V_b$ on lines 76, 77 are presented to the high speed encoder 68. In the encoder the dual self-clocking converter output signals are used to provide a dual complimentary clocking format. The encoder includes flip-flops 81, 82 of a type known in the art, such as D type edge triggered, each connected at the PRESET through INVERT 83, 84 to the output lines 76, 77 of the converter. The clock inputs of each are also connected to the output lines, but to the opposite one of the two lines associated with its PRESET input, such that the clock input of flip-flop 81 is connected to the line 77 and that of flip-flop 82 to the line 76. Each flip-flop is connected as a toggle with its Q output connected to its D input, such that each provides at its Q output on the lines 86, 88 a signal composite of the clock and PRESET input signals. These signals taken together represent the dual signal complimentary format of the received BRZ signals and are shown by the waveforms $V_A$, $V_B$ of illustrations (h), (i) appearing at the output of the encoder on the lines 86, 88 respectively. As illustrated the complimentary format signals are each NRZ and, in combination, decode to only three states, i.e. 1,1 or 1,0 or 0,1. The condition 0,0 which represents the null state of the input BRZ signal does not exist as in the dual NRZ signals from the converter. This results from the fact that in the complimentary format the signal information bit is stretched to the full bit cell time thereby eliminating that part of the bit time allocated to the null state in the input BRZ signal. As such the bit information in the complimentary signal format is contained in the transition in signal state from one bit to the succeeding bit such that the information must be decoded by comparing successive dual complimentary clocking signal states.

Figure 5:
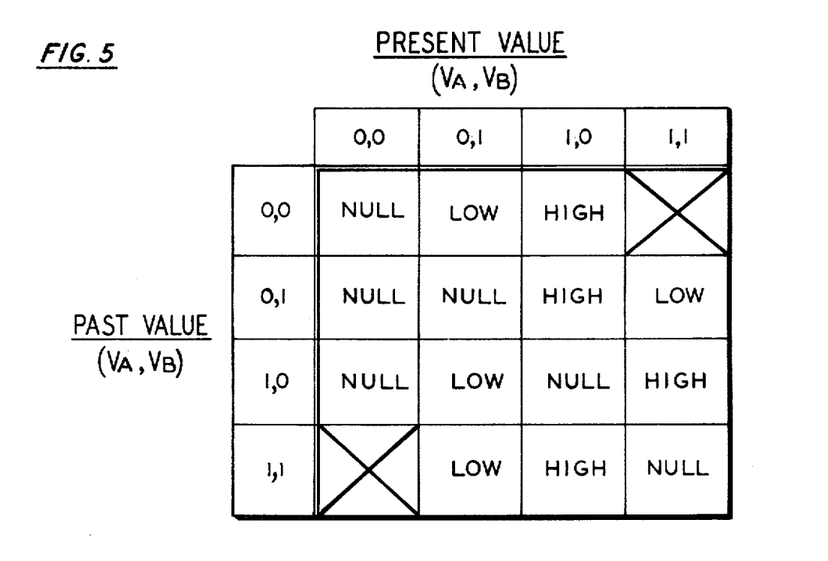
FIG. 5 is a tabulation of one operational function performed by the DITS receiver embodiment of FIG. 1.

In the operation of the encoder in response to the input BRZ signal of FIG. 3 illustration (e), an initial condition (89, illustrations (h), (i)) of $V_A=1$, $V_B=0$ is assumed for the dual NRZ self-clocking input signals (from the associated converter) shown in (f), (g). The first signal bit 90 of the BRZ signal is assumed low and $V_A$ transitions to a 0 and $V_B$ transitions to a 1, such that the change of $V_A$, $V_B$ from a 1, 0 to 0, 1 state represents a low level BRZ signal bit. The second bit 91 is similarly low and $V_A$ transitions to a 1 while $V_B$ remains in the 1 state; the transition from a 0, 1 to a 1, 1 state also representing a low level BRZ input bit. The third input bit 92 is high causing $V_A$ to remain the same while $V_B$ transitions to a 0, such that a 1, 1 to 1, 0 transition represents a high level BRZ signal bit. The remaining portions of the illustrations indicate the various transition states corresponding to the particular input bit state, all of which is listed in table form in FIG. 5 where the abscissa represents the present bit state values for $V_A$, $V_B$ respectively and the ordinate represents the past, or immediately preceding bit state set of values. By comparing past to present values the input signal bit state can be decoded. The state transition table of FIG. 5 also includes the fourth state of 0, 0 which does not exist for the dual complimentary clocking signals on the lines 86, 88 ($V_A$, $V_B$) however, this state is one of the existing states for the dual self-clocking NRZ signals at the output of the converter ($V_a$, $V_b$ on the lines 76, 77) which represents a null state for the BRZ signal.

Referring again to FIG. 1, the MPX 50 addresses each of the input channel in response to address (ADR) and enable (E) signals presented on lines 94 from a channel sequencer 95 which controls the timing and of the DITS receiver sequential sampling of the input data. The channel sequencer, which includes a programmable read only memory (PROM) having the channel select sequence and signal processing program therein, receives the time base signal from a system clock 96 which also provides the time base signal on the line 98 to the remaining elements of the receiver. The sequencer establishes the sample cycle period ($T_S$) within which the receiver's common sampling circuit (described hereinafter) samples each input channel for a channel sample time ($t_c$) at least once within the time interval of the high or low speed sample period ($T_{SL}$, $T_{SH}$).

In the DITS reeciver of FIG. 1 the number N of input channels (40–44) include M number of low speed channels (40–42) and P number of high speed channels (43, 44), or $N=M+P$. Since the minimum low speed sample frequency for the maximum low signal speed (14 KHz, ARINC 717-1) is 28 KHz, the maximum low speed sample period ($T_{SL}$) and, therefore, the maximum sample cycle period ($T_S$) is 35.71 μsec. The minimum high speed sample frequency is 200 KHz, but with the use of the high speed encoders (68, FIG. 4) it is reduced to 100 KHz which results in a maximum high speed sample period ($T_{SH}$) of 10 μsec. These represent the time associated with the minimum required samples of each channel and a higher number of samples would be preferred in each bit cell time of each received data word to ensure data integrity. The actual number of samples per bit cell is limited by the minimum channel sample time ($t_c$) i.e. the time interval for which the MPX 50 (FIG. 1) actually samples each channel. One object of the DITS receiver of the present invention is to use low speed logic, i.e. low cost, which limits the channel sample time to a minimum of 0.8 μsec. Depending on the total number (N) of input channels and the number of M low speed and P high speed channels the actual channel sample time may vary from 0.8 to 1.2 μsec. This range of $t_c$ is intended to allow for sampling of each high speed channel at a rate which is three times that of the low speed channels, and also to maintain a constant low speed sample frequency for various combinations of M and P since gap detection on the input data (detection of valid word as described hereinbefore) is accomplished by counting BRZ null state samples. This means that oversampling is done.

Figure 6:
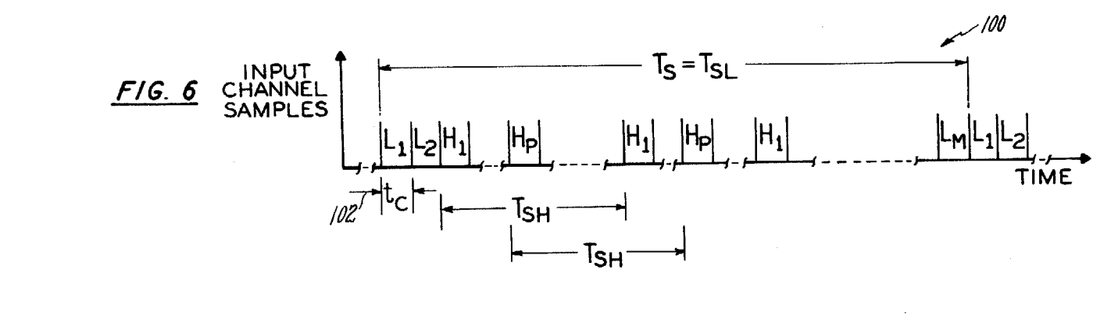
FIG. 6 is an illustration of another operational function performed by the DITS receiver embodiment of FIG. 1.

FIG. 6 illustrates generally the commutation of the samples of the high speed channels ($H_I$-$H_P$) and low speed channels ($L_I$-$L_M$) within a sample cycle period 100, each having a sample time ($t_c$) 102. The high speed sample time is $T_{SH}$ and low speed sample time is $T_{SL}$.

Figure 7:
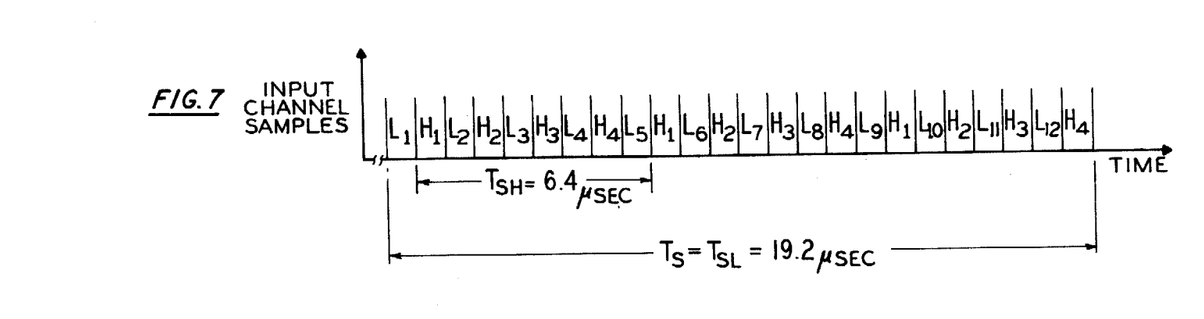
FIG. 7 is an illustration of one specific example of the operational function illustrated in FIG. 6.

If it is assumed that there are sixteen input channels (N=16) including twelve low speed (M=12) and four high speed (P=4), with $t_c$=0.8 μsec and with each high speed channel being sampled at three times the rate of the low speed channels, than there are twenty-four samples in each sample cycle period with $T_S$=$T_{SL}$=19.2 μsec. The high speed samples are interspersed or commutated with the low speed samples as illustrated in FIG. 7 for the assumed M=12, P=4 conditions, where the low speed channel samples are labeled $L_1$-$L_{12}$ and the high speed channel samples are $H_1$-$H_4$. The high speed channel sample time is 6.4 μsec ($T_{SH}$=6.4 μsec).

Referring again to FIG. 1, the sampled data is presented serially from the MPX to a state sequence controller 110 which receives the data at one input of a CONTROL PROM 112 and at one input of a control RAM 114. The RAM provides interim storage of each cell sample from each sample cycle period between successive samples, i.e. the last sample from each channel. Each channel sample is assigned to a different address in RAM corresponding to the input channel from which it was received, as determined by the address signals on the lines 94. As each new data bit from the lines 51 is written into the assigned address in RAM the previous bit stored at that address, i.e. the immediately preceding bit of the same serial data word being received on the particular input channel (past value) is read out of RAM and presented through lines 116 to a second input of the CONTROL PROM. The PROM includes the transition table of FIG. 5 in the form of a look-up table and the PROM decodes the input signal information by comparing samples of the state of the present received bit (present value) from the line 51 with that of the immediately preceding bit of the same word (past value) on the line 116 from the RAM to detect the transitions in each signal bit. The PROM provides the decoded NRZ binary signal bits on the lines 118 as a multiplexed serial data stream representative of the signal data sampled from each input channel. Each signal bit is unrelated to the adjacent bits which precede or follow it and each bit is individually steered either to the input of an address register 120 or to the input of a data RAM 122, depending upon whether the particular bit is in the first type ID of the received word or is within the remaining bytes representative of the actual data of the received word.

Since the received BRZ word format is fixed the relationship of the particular signal bit on the line 118 to the associated data word is determined by keeping track of the number of bits and bytes received for each word, beginning with the initial bit of the word. The RAM 114 counts the bits received in each word and those bits on the line 118 associated with the first byte of each word are read into the address register 120 at the location therein defined by the address signal on the line 94 which is the same address input to the MPX 50 and the RAM 114. This bit count is provided by counting the state transitions of each word following verification of the beginning of a valid word which is recognized by the immediate precedence of a gap interval having a minimum of four null state bit times as stated hereinbefore. The count information is provided from the PROM 112 on lines 124 to a control word decoder 126 included in the sequence controller 110, which decodes the bit count on the lines 124 and provides a discrete enable signal on the line 128 to the address register 120 in response to the presence of each first byte signal bit on the line 118. As a result, in the presence of the discrete enable, a signal bit appearing on the lines 118 is read into the register 120 at the particular address defined by the address signal appearing simultaneously on the lines 94. In response to a line 124 count indicative of a line 118 signal bit which is not part of the first byte of a data word, the decoder provides a discrete shift command signal on the line 128 which (1) inhibits the write-in of that bit into the address register 120, and (2) causes the read-out on lines 130 of the full first byte ID stored in the address register at the location defined by the presently appearing address signal on the lines 94. The first byte ID appearing on the lines 130 is presented to the data RAM arbitration circuit and forms part of the data RAM address, as described in detail hereinafter, at which each of the succeeding line 118 signal bits associated with that first byte ID are stored. The actual write-in of the signal bits into the data RAM is provided in response to the presence of a discrete write/enable signal presented to the arbitration circuit on the line 131 by the decoder 126 concurrent with the shift command signal on the line 128 to the address register 120.

The data RAM 122 stores the most recent value of each different data word appearing on each input channel. This includes signal data from a plurality of different originating sources (as described hereinbefore with respect to FIG. 2). The required RAM storage capacity is determined by the total number of different data words (pieces of data) required to be stored and the data word bit length. RAM addressing with the first byte ID is limited in the number of addressable locations to the bit length of the first byte. This is defined by the date word format and for an eight bit byte results in 256 addressable locations in RAM. Depending on the RAM, each location may be on data word wide, i.e.

have a bit length equal to that of the data word to be stored at that location, or only some portion of a data word, i.e. one byte wide in which case the number of locations for storing each word depends on the total number of bytes in each word. If the RAM is one data word wide and if the total number of pieces of data are less than the number of addressable locations provided directly by the first byte ID, then the first byte ID stored in address register 120 may be used directly as the input address to the data RAM. If, however, the RAM locations are less than one data word wide such that multiple locations are required for each data word than the address must be expanded to provide a sub-location designator with the first byte ID to steer each successive byte of data into the proper sub-location. In the embodiment of FIG. 1 it is assumed that the RAM is one byte wide, such that a sub-location designator is provided on lines 132 from the control word decode 126. This is combined with the lines 130 signal to provide the full address lines 134 to the RAM arbitration logic 136.

Similarly, as may be typical in an airborne DAU, the same data word may be provided on more than one input channel as a result of being transmitted from different originating signal sources, i.e. engine speed ($N_1$) originating directly from an engine mounted sensor and also provided indirectly through the electronic engine controller. Since the same data has the same first byte parameter ID there is no way of distinguishing the source and yet it may be important to store in RAM the value of the data as it appears from the different originating sources. If the same data is to be received at different input channels of the DITS receiver than channel information may be included in the RAM address to define different locations in RAM. This may be provided by combining the first byte ID with the channel address signal on the lines 94 in a mapping PROM which defines a uniquely different address for the same parameter ID in dependence on the particular one of the input channels received. In the situation where the same data is received in different data words from different originating sources as before, but is received on the same input channel such that channel information together with the first byte ID cannot distinguish between them, then a further data index is required. This is generally provided for in the transmission format, such as that in ARINC 717-1 where a Source Destination Index (SDI) comprising the first two signal bits immediately following the first byte ID is used to identify up to four different data words having the same parameter ID.

Figure 8:
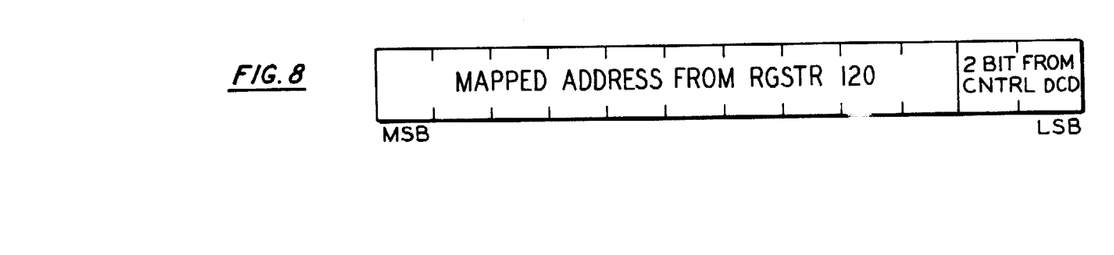
FIG. 8 is an illustration of an address signal format used in the description of the embodiment of FIG. 1.
Figure 9:
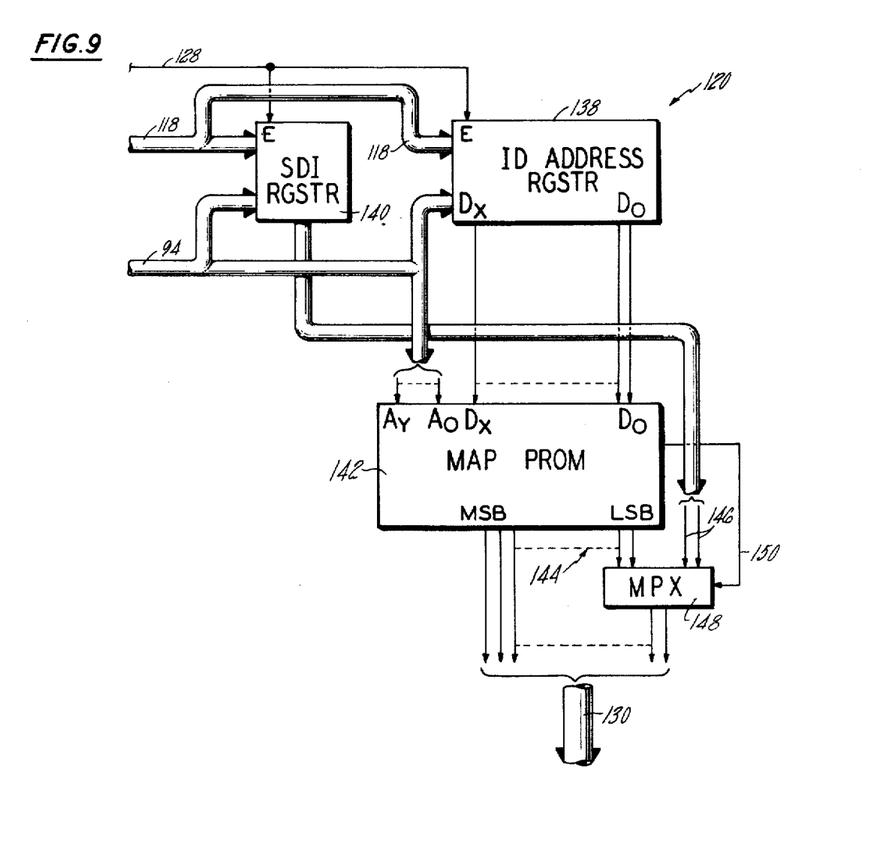
FIG. 9 is a simplified block diagram illustration of address mapping circuitry which may be used in the DITS receiver embodiment of FIG. 1.

A simplified block diagram of an address register 120 which includes both mapping circuitry and also an SDI decode is illustrated in FIG. 9. The data on lines 118 is strobed serially into an ID address register 138 and an SDI register 140, each of which receives the channel address signal on the lines 94 which steers the first byte bits and SDI bits of each data word into the location in each register associated with the channel on which the data word is received. Each of the first byte bits ($D_o$-$D_x$) stored in ID register 138 are presented together with the channel address signal bits ($A_o$-$A_y$) to a mapping PROM 142 which provides a selected bit length address (bit length dependent on required RAM address locations) on output lines 144. The two LSB's of the mapped address are multiplexed with the two SDI bits 146 of the SDI register in MPX 148 which selects one or the other of the two bit inputs depending upon the presence of an SDI enable discrete on the line 150 from the mapping PROM. In the presence of an SDI the two LSB's of the mapped address are replaced by the two SDI bits thereby providing a different address location in RAM for the same parameter presented in a second data word on the same channel but from a different source. The final mapped address is provided on lines 130 to the RAM arbitration circuit 136 as the most significant bits of the data RAM address. The RAM address format is illustrated in FIG. 8.

The signal bits of each received data word beyond those of the first byte are steered directly into the data RAM 122. This occurs directly, bit by bit as received, without the requirement for interim storage of the received bits until a complete word is received. Therefore, the time required to store the received data in the data RAM is significantly reduced and requires no processor time, i.e. does not contribute to the processor overhead. This, furthermore, results in a RAM memory array in which the CPU (34, FIG. 2) has access to each stored data word from any input channel by CPU memory read of a predefined data word identification, or parameter ID; the various parameter ID's or alternatively the mapped address of each data word, being stored in the processor. It is this feature of the DITS receiver of the present invention which allows it to be used in a system in which data must be accessed asynchronously by the CPU and in a different order than that in which it is received by the DITS, while still providing the latest update of any parameter. The alternative is to require separate routines to cause the "pop-up" of the requested data in the data RAM, all of which contributes to increased processor overhead time.

The data is stored as received, therefore, some means must be provided to inhibit the processor read out of an incomplete updated word from the RAM 122. In the DITS receiver 32 this is provided by the sequence controller 110 which sets a "busy" bit (MSB of the second byte of each received data word) automatically upon storage in the data RAM of the first signal bit of a received word, i.e. the first bit of the second byte. The busy bit is set in response to the presence of the discrete write/enable signal on the line 131 from the decoder 126. After all of the data bits have been received for a particular word and a valid trailing "gap" is detected, the busy bit for that word in RAM is cleared. Similarly, the CPU sets the busy bit for each word in RAM at system power-up to prevent the processor from outputting DITS data prior to a valid update. The busy bit allows the DITS to notify the CPU that the particular data word is presently being written in RAM, such that the CPU software will call for a reread of the word during the idle state for the particular word, i.e. the time between data updates. This allows CPU access to the data to be transparent to the DITS operation.

The DITS/CPU interface is provided with the bus interface 152 which includes the line receivers and line drivers as may be required in the system. The bus output to the RAM arbitration circuit 136 includes address lines 154 and read strobe line 156. The bus receives data from the RAM 122 on lines 158 and a RAM data ready discrete on line 160 from the RAM arbitration circuit 136. The RAM arbitration circuit 136 receives the RAM address from the DITS receiver on lines 134 and from the CPU on lines 154 at two inputs of an MPX 162 which is address controlled by the output signal from an AND gate 164 on the line 160 (RAM data ready). The AND gate receives the discrete on the line 131 from the control word decode 126 and the read strobe signal on the line 156 from the bus interface. In operation, the RAM arbitration logic provides for a delay of any CPU data RAM read cycle until the first channel sample cycle in which no RAM access is being performed by the DITS receiver. The CPU is delayed by using known handshaking protocol.

The DITS receiver of the present invention provides a high speed DMA in a simple hardware configuration. The present DITS receiver reduces the processing time required to receive, decode, and store asynchronous data from a multiple number of input channels, by stripping off the first byte identification of each data word as it is received and using this first byte ID as an address pointer to steer the remaining signal bits directly into the data RAM at the location defined by the pointer. This also allows the CPU to call up the data from RAM by its predetermined ID, i.e. data identification addressing. The reduction in the DITS receiver hardware count is provided by: (1) the use of a single, common sampling circuit for all of the input channels as opposed to a plurality of sampling circuits dedicated to one or more groups of channels, (2) the use of high speed encoding to reduce the required high speed sampling frequency by one-half thereby allowing use of slower (higher capacitance) logic, and (3) through the use of data identification addressing, i.e. direct write in of the data as received which eliminates hardware for interim data storage. The DITS provides the direct storage for all of the channel data, as received, asynchronously, and permits asynchronous access by the CPU to the latest updated value while inhibiting access during write in of the data thereby preventing erroneous data transmission to the processor.

Similarly, although the invention has been shown and described with respect to an illustrative embodiment thereof, it should be understood by those skilled in the art that the foregoing and various other changes, ommissions, and additions in the form and detail thereof may be made therein without departing from the spirit and the scope of the invention.

We claim:

1. A digital information transfer system (DITS) receiver for storing in a direct memory access (DMA) for a signal processor, a desired number of data signals presented asynchronously at selected signal speeds to one or more DITS input channels as serial bit data words having an information field with a first byte data identification (ID) and one or more succeeding bytes of data intelligence, comprising:

data sampling means for sampling each input channel at least once within each succeeding signal speed period to provide a serial sample bit stream of sampled signal bits from each channel;

register means having a plurality of addressable locations therein for registering signal bits;

data memory means, having a plurality of identifiable signal storage locations therein, at least one associated with each of the desired number of data signals, each location providing storage therein of the signal bits of the associated data word; and controller means, responsive to said serial sample bit stream, for presenting the first byte ID signal bits of each data word to said register means for accumulation therein of the full first byte ID of each data word at the one of said addressable locations associated with the data word, and for presenting simultaneously, in response to each accumulated first byte ID, each sampled data intelligence signal bit of said data word together with said accumulated first byte ID signal associated therewith to said data memory means for storage therein at the one of said signal storage locations identified by said accumulated first byte ID signal.

2. The receiver of claim 1, wherein each of said addressable locations of said register means is associated with a related one of the input channels, and wherein said controller means presents said sampled first byte ID signal bits to the one of said locations associated with the input channel at which said sampled ID signal bit was received.

3. The receiver of claim 1, wherein said memory means presents the data intelligence signal bits stored in each of said identifiable signal storage locations to the signal processor, on request, in response to an address signal therefrom which identifies the particular signal storage location by the first byte ID signal associated therewith.

4. The receiver of claim 2, wherein said controller means, in response to the presentation of identical first byte ID data words on different input channels, presents the sampled data intelligence signal bits of each identical first byte word to said data memory means together with an identifying location signal comprising the accumulated first byte ID signal in combination with a signal identifying the location in said register means in which the particular first byte ID signal was accumulated, thereby providing different identified storage locations in said data memory means for each of said identical first byte ID data words.

5. The receiver of claim 1, further comprising:

signal conditioning means, one for each input channel, each response to the data signals presented thereto for providing to said data sampling means dual signals having signal bit formats compatible to the signal processor, said dual signals in combination providing a manifestation of the signal information of each signal bit of the received data word; and wherein, said controller converts each dual sampled signal bit from each signal conditioning means to a corresponding single sampled signal bit prior to presentation to said register means or said data memory means, each of said single sampled signal bits having the same information as the received signal bit associated therewith.

6. A digital information transmission system (DITS) receiver for storing in a direct memory access (DMA) data signals presented at different signal speeds to one or more DITS input channels as serial signal bit data words having an information field with a first byte of data identification (ID) and one or more succeeding bytes of data intelligence, comprising:

data sampling means, including a signal multiplexing means connected to each input channel and responsive to channel address signals presented from a control means, for sampling each channel at least once within the time period of the signal presented to the channel, and for providing at an output thereof a serial multiplexed bit stream of sampled signal bits from all channels;

register means, having a plurality of signal registration locations therein, one for each input channel and each identified by said channel address signals presented thereto from said control means, said register means providing, alternately, registration of said sampled signal bits at registration locations identified therein by said channel address signals in the presence of a registration signal, and presentation of signal bits registered at locations therein identified by said channel address signals on output lines thereof in the presence of a shift signal;

data memory means, having an address signal input connected for response to said output lines of said register means, and having a plurality of signal storage locations for storing signal bits therein, each location identified by an associated data memory address signal presented at said address signal input; and control means, including means for providing said channel address signals, and connected for response to said data sampling means, said register means, and said data memory means for presenting said sampled first byte ID signal bits to said register means and for presenting said sampled intelligence byte signal bits to said data memory means, said controller means simultaneously presenting to said register means with each first byte ID signal bit said registration signal and said channel address signal identifying the channel on which each sampled ID signal bit is received, said controller means further presenting to said register means, in response to the presence simultaneously of an accumulated first byte and a sampled data intelligence signal bit of the data word associated therewith, said shift signal thereby presenting said accumulated first byte to said address signal input of said data memory means to identify the location therein for storage of the sampled data intelligence signal bit.

7. The method of storing in memory in a digital information transfer system (DITS) receiver serial bit data words presented asynchronously at selected signal speeds to one or more DITS input channels, each data word having an information field with a first byte data identification (ID) and one or more succeeding bytes of data intelligence, comprising the steps of:

multiplexing the signal bits of the data words received at all input channels into a single, serial bit data stream of sampled signal bits from each channel;

accumulating the sampled signal bits corresponding to first byte ID signal bits of each data word in an address register associated with the input channel on which the data word is received and indicating the presence of each accumulated first byte ID; and storing each sampled signal bit corresponding to the data intelligence bytes of each data word having an accumulated first byte ID in a data memory at a location therein identified by said accumulated first byte ID.

8. The method of claim 7, wherein the step of storing includes storing the data intelligence in the data memory at a location identified by the first byte ID in combination with information identifying the associated channel register in which the first byte ID is accumulated.

9. The method of storing in a direct memory access (DMA) for a signal processor, a desired number of serial bit data words presented asynchronously at selected signal speeds to one or more DITS input channels, each data word having an information field with a first byte data identification (ID) and one or more succeeding bytes of data intelligence, comprising the steps of:

multiplexing the signal bits of the data words received at all input channels into a single, serial bit data stream of sampled signal bits from each channel;

accumulating the sampled signal bits corresponding to first byte ID signal bits of each data word in an address register associated with the input channel on which the data word is received and indicating the presence of each accumulated first byte ID;

storing each sampled signal bit corresponding to the data intelligence bytes of each data word having an accumulated first byte ID in a data memory at an address location therein identified by said accumulated first byte ID; and instructing the signal processor to identify the address locations of the data intelligence stored in the data memory in terms of the first byte ID associated with each when retrieving the stored data from memory.

* * * * *